United States Patent
Mihaila et al.

(10) Patent No.: US 8,489,645 B2
(45) Date of Patent: Jul. 16, 2013

(54) TECHNIQUES FOR ESTIMATING ITEM FREQUENCIES IN LARGE DATA SETS

(75) Inventors: George Andrei Mihaila, Yorktown Heights, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 2345 days.

(21) Appl. No.: 10/950,800

(22) Filed: Sep. 27, 2004

(65) Prior Publication Data
US 2006/0074963 A1    Apr. 6, 2006

(51) Int. Cl.
*G06F 7/00* (2006.01)

(52) U.S. Cl.
USPC .......................... 707/802; 707/803; 707/807

(58) Field of Classification Search
None
See application file for complete search history.

(56) References Cited

U.S. PATENT DOCUMENTS

| | | | | |
|---|---|---|---|---|
| 6,385,608 | B1 * | 5/2002 | Mitsuishi et al. | 707/6 |
| 6,418,441 | B1 * | 7/2002 | Call | 707/10 |
| 6,507,843 | B1 * | 1/2003 | Dong et al. | 707/6 |
| 7,194,477 | B1 * | 3/2007 | Bradley et al. | 707/102 |
| 2002/0124001 | A1 * | 9/2002 | Chaudhuri et al. | 707/100 |

OTHER PUBLICATIONS

B.H. Bloom, entitled "Space/Time Trade-Offs in Hash Coding with Allowable Errors," Communications of the ACM, Computer Usage Company, vol. 13, No. 7, pp. 422-426, Jul. 1970.
J.S. Vitter, entitled "Random Sampling with a Reservoir," Brown University, ACM Transactions on Mathematical Software, vol. 11, No. 1, pp. 37-57, Mar. 1985.

* cited by examiner

*Primary Examiner* — Fred I Ehichioya
*Assistant Examiner* — Hasanul Mobin
(74) *Attorney, Agent, or Firm* — Anne V. Dougherty; Ryan, Mason & Lewis, LLP

(57) ABSTRACT

Techniques for estimating items (e.g., data item or objects) frequencies in large data sets are disclosed. For example, a technique for determining items and their frequencies at multiple levels of interest in a collection of nested bags includes the following steps. A hierarchy of a plurality of levels of nested bags and the levels of interest are inputted. Among the plurality of levels, a subset of bags is sampled from at least one level. At each level of interest, the frequency is counted of each distinct item in the bags obtained in the sampling step. At each level of interest, the item frequencies obtained in the counting step are extrapolated based on sampling ratios associated with the sampling step. At each level of interest, the items are sorted according to their frequencies obtained from the extrapolating step and those items with highest frequencies are retained. A bag may refer to one or more subsets or groups of data items or objects. Also, a bag may, itself, contain one or more other bags.

14 Claims, 4 Drawing Sheets

TECHNIQUES FOR ESTIMATING ITEM FREQUENCIES IN LARGE DATA SETS

FIELD OF THE INVENTION

The present invention relates to data processing and, more particularly, to techniques for estimating item frequencies in large data sets.

BACKGROUND OF THE INVENTION

There are many practical situations when a large data set needs to be analyzed and summarized. However, examining the entire data set would involve a prohibitive computational cost.

As one familiar example, consider the shopping-basket data collected by a large on-line grocery retailer. The management would like a report of the sales volume for most popular items and of the number of customers which purchased each of these items.

As another example, from the area of data management, more specifically from the area of statistics collection for an XML (Extensible Markup Language) data management system, consider a collection of XML documents stored in a database. A query optimizer component needs access to histograms of the most frequent paths in the document collection and the number of documents which contain each of these paths.

SUMMARY OF THE INVENTION

Principles of the present invention provide techniques for estimating items (e.g., data item or objects) frequencies in large data sets.

In one illustrative aspect of the invention, a technique for determining items and their frequencies at multiple levels of interest in a collection of nested bags includes the steps of: (a) inputting a hierarchy of a plurality of levels of nested bags and the levels of interest; (b) among the plurality of levels, sampling a subset of bags from at least one level; (c) at each level of interest, counting the frequency of each distinct item in the bags obtained at the previous step; (d) at each level of interest, extrapolating the item frequencies obtained at step (c) based on sampling ratios associated with step (b); and (e) at each level of interest, sorting the items according to their frequencies obtained from step (d) and retaining those items with highest frequencies. A "bag" may refer to one or more subsets or groups of data items or objects. Also, a bag may, itself, contain one or more other bags.

The technique may include the step of using a bounded amount of memory regardless of a collection size and without prior knowledge of the collection size. Further, the technique may include accessing a bounded number of bags at each level. Still further, the technique may include using a single pass over the nested collection of bags.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be understood that principles of the present invention will be illustratively described below in the context of "bags" of data items or objects. A "bag," also known as a "multi-set," is a collection of objects that are not necessarily distinct from each other. It is to be understood that the term "bag" as used herein is generally intended to refer to one or more subsets or groups of data items or objects. Also, a bag may, itself, contain one or more other bags. By way of example only, the data items or objects could be grocery items purchased by a buyer from an on-line grocery retailer, or the data items or objects could be XML documents in an XML document database. It is to be further understood that principles of the present invention are not limited to any particular type of data item or object. Rather, principles of the invention are more generally applicable to any data processing environment in which it would be desirable to efficiently and effectively determine data items or objects of interest and estimate their frequencies within the overall data set.

Accordingly, in an illustrative embodiment, consider a large set of bags, each bag containing a large number of items, not necessarily distinct from each other. Some key problems that principles of the invention address in this illustrative embodiment include: (1) how to estimate the number of bags that contain the most frequent items; and (2) how to estimate the counts of the most frequent items in all the bags by examining only a limited subset of all the bags and a limited sample of the items present in these bags.

Furthermore, it is to be appreciated that the inventive methodology, illustratively described below, is applicable to a collection with arbitrarily many levels of nested bags. We will refer to the bottom level by the name of the items and to the other levels as top levels.

Figure 1:
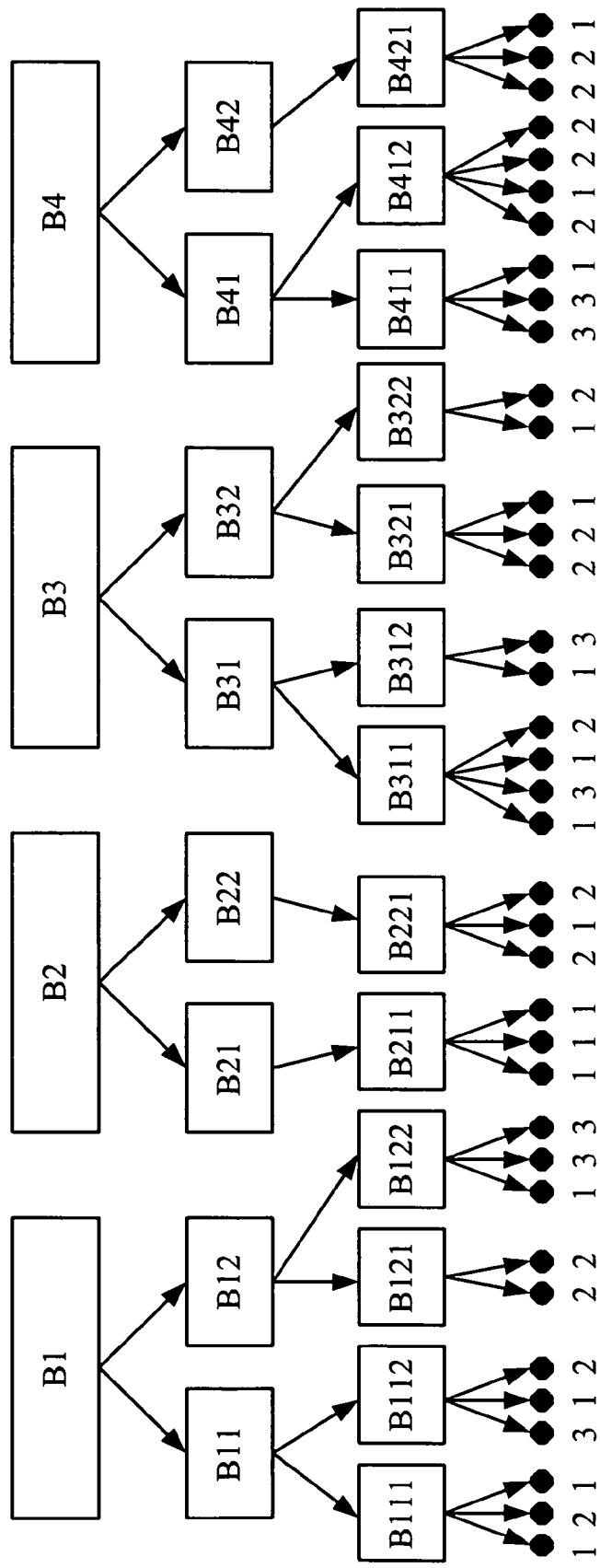
FIG. 1 is a block diagram illustrating an exemplary collection of nested bags according to one embodiment of the present invention.

Referring now to FIG. 1, an exemplary nested collection of bags according to an exemplary embodiment of the present invention is illustrated. This exemplary nested collection has four levels out of which the top three levels contain bags and the bottom level is constituted of items. Thus, the first level contains four bags B1, B2, B3 and B4. Each of these bags contains, in turn, other bags. For example, the bag B3 further contains bags B31 and B32, which are situated at the second nesting level. Each of the bags at the second level contains, in turn, bags situated at the third level. For example, the bag labeled B31 further contains the bags B311 and B312. Finally, the third-level bags contain items. For example, the bag labeled B311 contains the following items: "1", "3", "1", and "2".

It is important to note that the item labeled "1" occurs twice in bag B311. There are many situations where the same item may occur several times in a bag. For example, in the case of a grocery store, the third-level bags could represent actual shopping baskets which can contain multiple occurrences of the same item (e.g., "milk"), second-level bags could represent collections of shopping baskets from the same store, and the first-level bags could represent collections of store bags from the same county.

For simplicity of illustration, we are first describing an illustrative embodiment of the present invention in terms of a collection with only two levels of nested bags: the top level is the level of the bags and the bottom level is the level of the items. At the top level, we consider a set of bags $S_B=\{B_1, B_2, \ldots, B_N\}$. Each bag $B_i$ contains zero or more elements, not necessarily distinct. The elements of the bags belong to a set $O=\{o_1, o_2, \ldots, o_D\}$. For every item $o_j$ denote by $C_j$ the number of bags which contain it as an element and by $F_j$ the number of times this item is present in the entire set of bags $S_B$.

Principles of the present invention provide a method for estimating $C_j$ and $F_j$ by performing a two-level sampling on the set of bags $S_B$. Although in this illustrative embodiment, the sampling method used is uniform sampling, it should be understood that the applicability of principles of the present invention are not restricted to employing uniform sampling as other sampling methods can be used.

Step 1. The first step includes selecting a sub-set $S'_B$ of $S_B$ through uniform sampling. Denote by n the size of $S'_B$. Then, $$S'_B=\{B_{i1}, B_{i2}, \ldots, B_{in}\}.$$

Step 2. The second step includes the following two sampling operations: 2a for estimating $C_j$ for each item $o_j$ in O; and 2b for estimating $F_j$ for each item $o_j$ in O. The operations 2a and 2b can be performed in parallel, on the same set $S'_B$.

Step 2a. (Estimating $C_j$, the number of bags in $S_B$ which contain item $o_j$, for all items $o_j$ in the set O.)

Construct a bag U of items containing all the items in the bags in $S'_B$, each unique item occurring once for every bag in $S'_B$ that contains it. One method for constructing U is the methodology depicted in FIG. 2.

Figure 2:
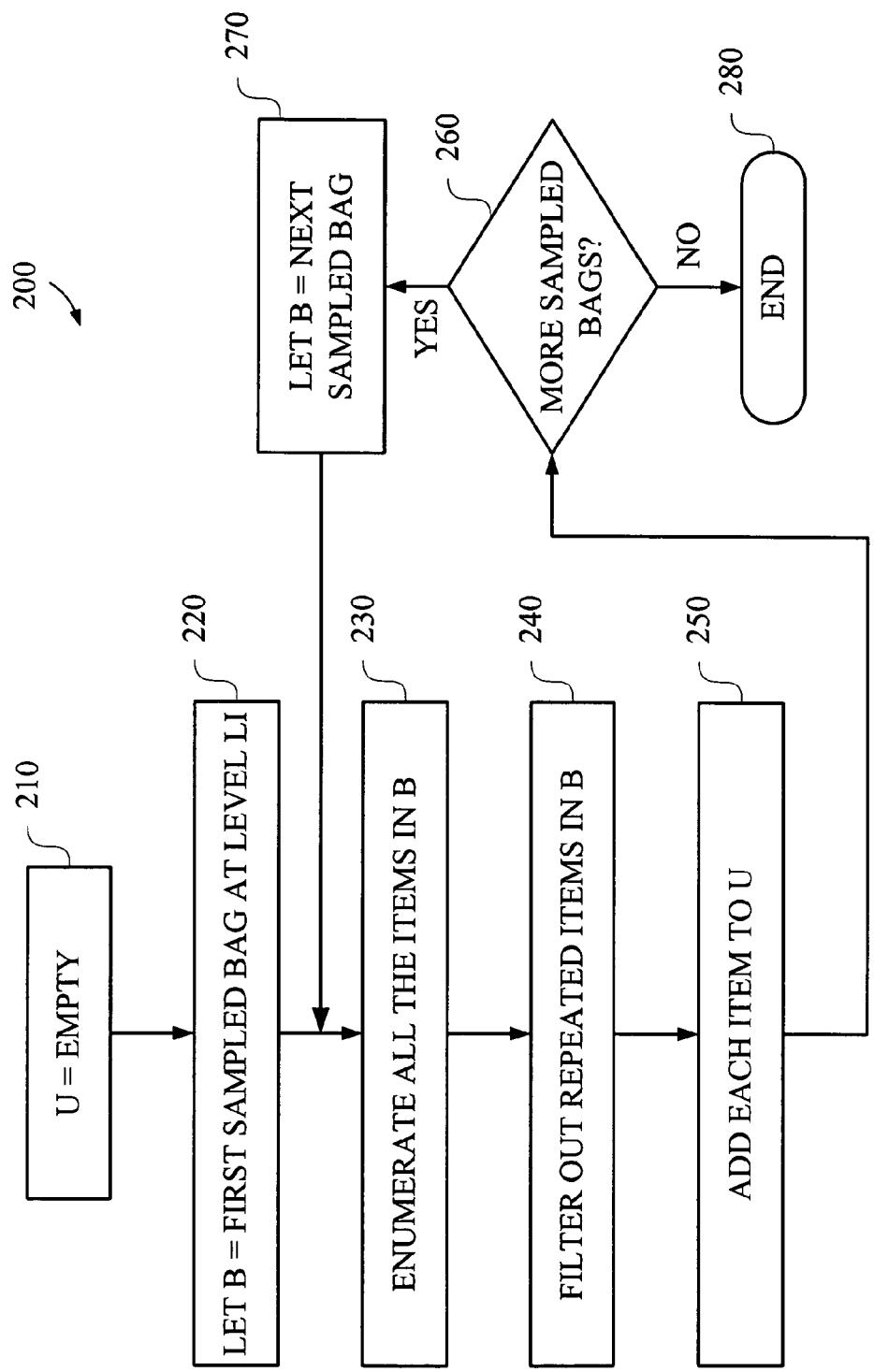
FIG. 2 is a flow diagram illustrating a methodology for counting the frequencies of unique items at a given level of interest according to one embodiment of the present invention.

Referring now to FIG. 2, a methodology for determining the frequencies of items at a given level of interest LI according to an exemplary embodiment of the present invention is illustrated. The methodology 200 operates at a given level LI in the nested collection of bags. The methodology constructs a bag U containing all the items in a set of sampled bags at level LI, each item occurring in U as many times as there are bags that contain it.

The steps of methodology 200 are as follows. Step 210 initializes U to the empty bag. Step 220 selects the first sampled bag at level LI and assigns it to a variable B. Step 230 enumerates all the items that are contained in bag B. It should be noted that if B contains bags rather than items, then all the nested bags in B are opened until all the items indirectly contained in B are enumerated. Step 240 filters out all the repeated items (it eliminates the duplicate items). In one embodiment of the present invention, this step may be realized by using a Bloom filter (see B. Bloom, "Space/time Trade-offs in Hash Coding with Allowable Errors," Communications of the ACM, July 1970, vol. 13(7), pp. 422-426, the disclosure of which is incorporated by reference herein) which can eliminate duplicated items using a constant amount of memory. All the items which have passed the filter at step 240 are added to U in step 250. Step 260 determines if there are more sampled bags at the level LI: if there are, the execution continues with step 270, else, the execution completes. Step 270 selects the next sampled bag and jumps back to step 230.

Denote by M the size of U.

Now, through uniform sampling, select a subset of size m of U, named U'.

For every unique item $o_j$, denote by $C'_j$ the number of pairs in U' which contain $o_j$. Then, for every item $o_j$ in O, the count $C_j$ is estimated by the following formula:

$$C_j=C'_j*(M/m)*(N/n)$$

The explanation of this formula is the following:
since the number of bags containing each item has been counted by examining a uniform sample of size m of all the M item occurrences in U, the count has to be adjusted by multiplying it with (M/m) to obtain an estimate of the number of bags that contain each item, out of the set of bags $S'_B$.
since only a subset ($S'_B$) of size n of the entire set of N bags has been selected, the count has to be adjusted by multiplying it with (N/n) to obtain an estimate of the number of bags that contain each item, out of the entire set of bags $S_B$.

The above formula is appropriate for uniform sampling. When using a different sampling method, the count $C_j$ will need to be extrapolated from $C'_j$ by using a different formula.

Step 2b. (Estimating $F_j$, the number of occurrences of item $o_j$ in all the bags in $S_B$, for all items $o_j$ in the set O).

Construct a bag V containing all the item occurrences in the bags in $S'_B$.

The bag V contains as many occurrences of each specific item $o_j$ as the number of occurrences of the item $o_j$ inside all the bags $B_{ik}$ in $S'_B$.

Denote by P the size of V. Now, through uniform sampling, select a subset of size p of V, named V'. For every item $o_j$ denote by $F'_j$ the number of pairs in V' which contain $o_j$. Then, for every item $o_j$, $F_j$ is estimated by the following formula:

$$F_j=F'_j*(P/p)*(N/n)$$

The explanation of this formula is the following:
since the number of bags containing each item has been counted by examining only a uniform sample of size p of all the P item occurrences in V, the count has to be adjusted by multiplying it with (P/p) to obtain an estimate of the number of occurrences of each item in the set of bags $S'_B$.
since only a subset ($S'_B$) of size n of the entire set of N bags has been selected, the count has to be adjusted by multiplying it with (N/n) to obtain an estimate of the number of occurrences of each item in the entire set of bags $S_B$.

The above formula is appropriate for uniform sampling. When using a different sampling method, the count $F_j$ will need to be extrapolated from $F'_j$ by using a different formula.

Figure 3:
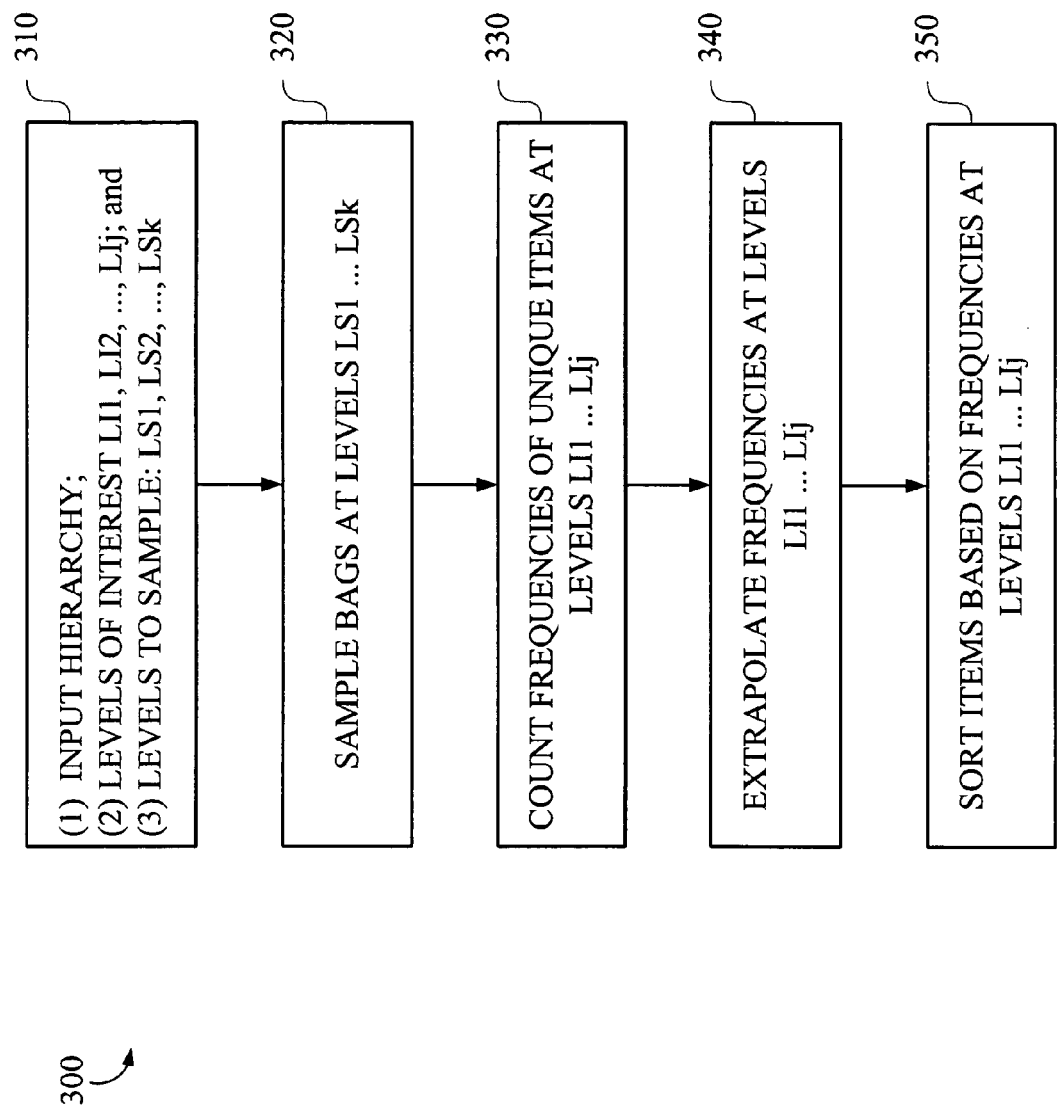
FIG. 3 is a flow diagram illustrating a methodology for determining frequencies of popular items in a collection of nested bags according to one embodiment of the present invention.

Referring now to FIG. 3, we describe now a methodology 300 for determining the frequencies of popular items in a collection with arbitrarily many levels of nesting. The input (block 310) to the method consists of three parts: (1) the hierarchy of nested bags at multiple levels; (2) the levels of interest LI1, LI2, . . . , LIj (these are the levels in which we are interested in determining the frequencies of popular items); and (3) levels of sampling: LS1, LS2, . . . , LSk (these are the levels on which sampling will be performed).

Step 1—Sampling (step 320): Suppose LS1, LS2, . . . , LSk are labeled from top to bottom. Methodology 300 performs sampling at these levels in a top-down fashion. That is, the methodology samples a subset of bags at level LS1 first. The bags in this subset will be sampled at level LS2. This sampling process is continued until level LSk. The sampling methodology and sampling ratio used at each level can be specified by the user for a specific application. By way of example, in an application with predefined memory constraint and no knowledge about the size of the collection (i.e., the number of bags at each level), the reservoir sampling method (see, J. S. Vitter, "Random Sampling with a Reservoir," ACM Transactions of Mathematical Software, March 1985, vol. 11(1), pp. 37-57, the disclosure of which is incorporated by reference herein) can be used and no sampling ratio needs to be specified.

Step 2—Counting (step 330): For each sampled bag at level LSk, the items in the bag are examined one by one. Each item is counted at levels LI1, LI2, . . . , LIj during this examination. Note that an item is counted differently at different levels. The details of the counting step is explained above in FIG. 2.

Step 3—Extrapolation (step 340): The counts obtained from the previous step are extrapolated based on the sampling method/ratio used in Step 1 (step 320). For example, if the uniform sampling method is used at each level and an item has a count C at level LIm ($1<=m<=j$), C can be extrapolated using the following formula: $C=C/(R\_LS1*R\_LS2* \ldots * R\_LSn)$ where R_LSi is the sampling ratio at level LSi, and levels LS1, LS2, . . . LSn are all the levels that are either above LIm or at the same level as LIm.

Step 4—Sorting (step 350): At each interested level, the items are sorted by their extrapolated counts. The ones with highest frequencies are returned.

Figure 4:
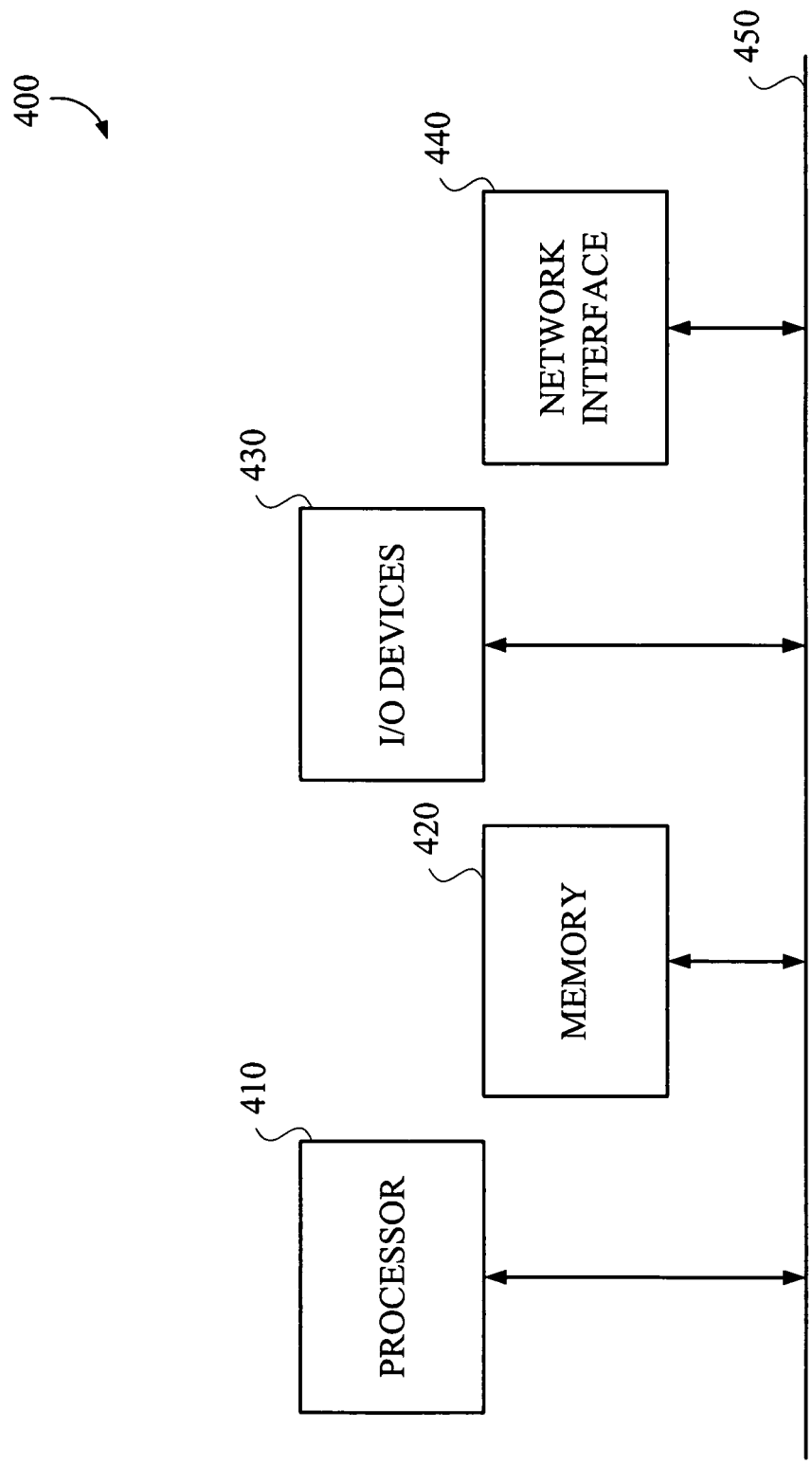
FIG. 4 is a block diagram illustrating a computer system suitable for implementing a data item/object frequency estimation system, according to one embodiment of the present invention.

Referring lastly to FIG. 4, a computer system suitable for implementing a data item/object frequency estimation system, according to an exemplary embodiment of the present invention, is illustrated. For example, the illustrative architecture of FIG. 4 may be used in implementing any and all of the steps and/or components described in the context of FIGS. 1 through 3.

As shown, the computer system 400 may be implemented in accordance with a processor 410, a memory 420, I/O devices 430, and a network interface 440, coupled via a computer bus 450 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory is a non-transitory computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing data item/object frequency estimation services. By way of example, a service provider agrees (e.g., via a service level agreement or some informal agreement or arrangement) with a service customer or client to provide data item/object frequency estimation services. That is, by way of one example only, the service provider may host the customer's web site and associated applications. Then, in accordance with terms of the contract between the service provider and the service customer, the service provider provides services that may include one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of determining frequencies of data objects within a data set, the method comprising steps of:
   a. inputting a hierarchy of a plurality of levels of nested groups of objects from the data set, and specifying one or more identified levels of the plurality of levels to be considered;
   b. among the plurality of levels, sampling a subset of groups of objects from at least one level, wherein one or more sampling ratios are generated;
   c. at each identified level, counting the frequency of each distinct object in the groups of objects obtained at the previous step, wherein one or more object frequencies are generated;
   d. at each identified level, extrapolating the one or more object frequencies obtained at step (c) based on the one or more sampling ratios associated with step (b); and
   e. at each identified level, sorting the objects according to their frequencies obtained from step (d) and retaining those objects with highest frequencies.

2. The method of claim 1, further comprising a step of using a bounded amount of memory regardless of a collection size and without prior knowledge of the collection size.

3. The method of claim 1, further comprising a step of accessing a bounded number of groups of objects at each level.

4. The method of claim 1, further comprising a step of using a single pass over the nested collection of groups of objects.

5. The method of claim 1, wherein one or more objects in a group represent one or more items associated with an on-line retailer.

6. The method of claim 1, wherein one or more objects in a group represent one or more documents associated with a document database.

7. An apparatus for determining frequencies of data objects within a data set, comprising:
   a memory; and
   at least one processor coupled to the memory and configured to perform operations of: (a) inputting a hierarchy of a plurality of levels of nested groups of objects from the data set, and specifying one or more identified levels of the plurality of levels to be considered; (b) among the plurality of levels, sampling a subset of groups of objects from at least one level, wherein one or more sampling ratios are generated; (c) at each identified level, counting the frequency of each distinct object in the groups of objects obtained at the previous operation, wherein one or more object frequencies are generated; (d) at each identified level, extrapolating the one or more object frequencies obtained at operation (c) based on the one or more sampling ratios associated with operation (b); and
(e) at each level of interest, sorting the objects according to their frequencies obtained from operation (d) and retaining those objects with highest frequencies.

8. The apparatus of claim 7, wherein the at least one processor is further configured to perform the operation of using a bounded amount of memory regardless of a collection size and without prior knowledge of the collection size.

9. The apparatus of claim 7, wherein the at least one processor is further configured to perform the operation of accessing a bounded number of groups at each level.

10. The apparatus of claim 7, wherein the at least one processor is further configured to perform the operation of using a single pass over the nested collection of groups.

11. The apparatus of claim 7, wherein one or more objects in a group represent one or more items associated with an on-line retailer.

12. The apparatus of claim 7, wherein one or more objects in a group represent one or more documents associated with a document database.

13. An article of manufacture for determining frequencies of data objects within a data set, comprising a non-transitory computer readable storage medium containing one or more programs which when executed by a computer implement the steps of:
   a. inputting a hierarchy of a plurality of levels of nested groups of objects from the data set, and specifying one or more identified levels of the plurality of levels to be considered;
   b. among the plurality of levels, sampling a subset of groups of objects from at least one level, wherein one or more sampling ratios are generated;
   c. at each identified level, counting the frequency of each distinct object in the groups of objects obtained at the previous step, wherein one or more object frequencies are generated;
   d. at each identified level, extrapolating the one or more object frequencies obtained at step (c) based on the one or more sampling ratios associated with step (b); and
   e. at each identified level, sorting the objects according to their frequencies obtained from step (d) and retaining those objects with highest frequencies.

14. A method of providing a service for determining frequencies of data objects within a data set, comprising a step of:
   a service provider enabling steps of:
      a. inputting a hierarchy of a plurality of levels of nested groups of objects from the data set, and specifying one or more identified levels of the plurality of levels to be considered;
      b. among the plurality of levels, sampling a subset of groups of objects from at least one level, wherein one or more sampling ratios are generated;
      c. at each identified level, counting the frequency of each distinct object in the groups of objects obtained at the previous step, wherein one or more object frequencies are generated;
      d. at each identified level, extrapolating the one or more object frequencies obtained at step (c) based on the one or more sampling ratios associated with step (b); and
      e. at each identified level, sorting the objects according to their frequencies obtained from step (d) and retaining those objects with highest frequencies.

* * * * *